(12) United States Patent
Kang et al.

(10) Patent No.: US 11,392,012 B2
(45) Date of Patent: Jul. 19, 2022

(54) MULTI-INPUT FOLDED CAMERA AND MOBILE DEVICE INCLUDING THE SAME

(71) Applicant: Samsung Electronics Co., Ltd., Suwon-si (KR)

(72) Inventors: Hyunjin Kang, Seoul (KR); Hyunsu Jun, Seongnam-si (KR); Younggyu Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 234 days.

(21) Appl. No.: 16/884,443

(22) Filed: May 27, 2020

(65) Prior Publication Data

US 2021/0116791 A1     Apr. 22, 2021

(51) Int. Cl.
| | |
|---|---|
| *G02B 27/10* | (2006.01) |
| *G03B 17/17* | (2021.01) |
| *H04M 1/02* | (2006.01) |
| *G02B 17/02* | (2006.01) |

(52) U.S. Cl.
CPC ........... *G03B 17/17* (2013.01); *G02B 17/023* (2013.01); *G02B 27/106* (2013.01); *H04M 1/0264* (2013.01)

(58) Field of Classification Search
CPC . G02B 17/023; G02B 27/106; H04M 1/0264; G03B 17/17
USPC .................................. 359/618, 726
See application file for complete search history.

(56) References Cited

U.S. PATENT DOCUMENTS

| | | |
|---|---|---|
| 8,629,930 B2 | 1/2014 | Brueckner et al. |
| 9,992,477 B2 | 6/2018 | Pacala et al. |
| 10,084,958 B2 | 9/2018 | Georgiev et al. |
| 10,222,475 B2 | 3/2019 | Pacala et al. |
| 10,326,942 B2 | 6/2019 | Shabtay et al. |
| 2016/0307303 A1 | 10/2016 | Ishigami |
| 2017/0111558 A1 | 4/2017 | Brueckner et al. |
| 2017/0227439 A1* | 8/2017 | Tatarkiewicz ..... G01N 15/1429 |
| 2019/0104242 A1 | 4/2019 | Wippermann et al. |

\* cited by examiner

*Primary Examiner* — William Choi
(74) *Attorney, Agent, or Firm* — Harness, Dickey & Pierce, P.L.C.

(57) ABSTRACT

A multi-input folded camera includes a plurality of folding devices, a common lens array, and a sensor. The folding devices change paths lights that are incident to the folding devices and output a plurality of folded lights propagating along a plurality of paths. The common lens array combines the folded lights received through an input surface of the common lens array to output a combined light through an output surface of the common lens array. The sensor is at an optical axis of the common lens array to receive the combined light. Performance of a mobile device including the multi-input folded camera is enhanced by sufficient light amounts using the multiple folding devices and combining the lights through the multiple light paths. In implementing an under display camera (UDC), an entire-region display is supported without an aperture in a display panel.

20 Claims, 13 Drawing Sheets

MULTI-INPUT FOLDED CAMERA AND MOBILE DEVICE INCLUDING THE SAME

CROSS-REFERENCE TO RELATED APPLICATION

This U.S. non-provisional application claims priority under 35 USC § 119 to Korean Patent Application No. 10-2019-0130443, filed on Oct. 21, 2019, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a multi-input folded camera and a mobile device including the multi-input folded camera.

2. Discussion of the Related Art

A digital camera module is integrated in various host devices such as a mobile phone, a personal portable device, a computing device etc. and demand on the integrated digital camera module is increasing. Accordingly, a high-performance digital camera with a small occupation area that may be integrated in a host device efficiently may be beneficial.

SUMMARY

Some example embodiments may provide a multi-input folded camera having high performance even in low-luminance environments.

Some example embodiments may provide a mobile device including a multi-input folded camera having high performance even in low-luminance environments.

According to example embodiments, a multi-input folded camera includes a plurality of folding devices, a common lens module and a sensor. The plurality of folding devices configured to change paths of lights incident to the plurality of folding devices in a first direction and to output a plurality of folded lights propagating along a plurality of paths on a plane perpendicular to the first direction; the common lens array configured to combine the plurality of folded lights through an input surface of the common lens array and to output a combined light through an output surface of the common lens array; and the sensor at an optical axis of the common lens array, the sensor configured to receive the combined light. According to example embodiments, a mobile device includes a housing case having an upper surface, the upper surface defining an opening; a display panel in the opening defined by the upper surface of the housing case; and a multi-input folded camera below the display panel. The multi-input folded camera comprising a plurality of folding devices configured to change paths of lights that are incident to the plurality of folding devices in a first direction and to output a plurality of folded lights propagating along a plurality of paths on a plane perpendicular to the first direction; a common lens array configured to receive, through an input surface, the plurality of folded light, combine the plurality of folded lights, and to output the combined light through an output surface; and a sensor at an optical axis of the common lens array, the sensor configured to receive the combined light.

According to example embodiments, a multi-input folded camera includes a first folding device configured to change a light path of a first light that is incident to the first folding device in a first direction and to output a first folded light propagating along a first path on a plane perpendicular to the first direction; a second folding device configured to change a light path of a second light that is incident to the second folding device in the first direction and to output a second folded light propagating along a second path on the plane; a third folding device configured to change a light path of a third light that is incident to the third folding device in the first direction to output a third folded light propagating along a third path on the plane; a common lens array configured to receive the first folded light, the second folded light, and the third folded light through an input surface, combine the first folded light, the second folded light, and the third folded light and to output a combined light through an output surface of the common lens array; and a sensor at an optical axis of the common lens array, the sensor configured to receive the combined light.

The multi-input folded camera and the mobile device including the multi-input folded camera according to example embodiments may enhance reliability of information provided from the sensor and/or quality of image provided from the sensor by combining lights through the plurality of light paths to increase light amount input to the sensor.

The multi-input folded camera according to example embodiments may be disposed under the display panel to be implemented as a front camera of the mobile device and efficiently support entire-region display without an aperture in the display panel for high penetration rate.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
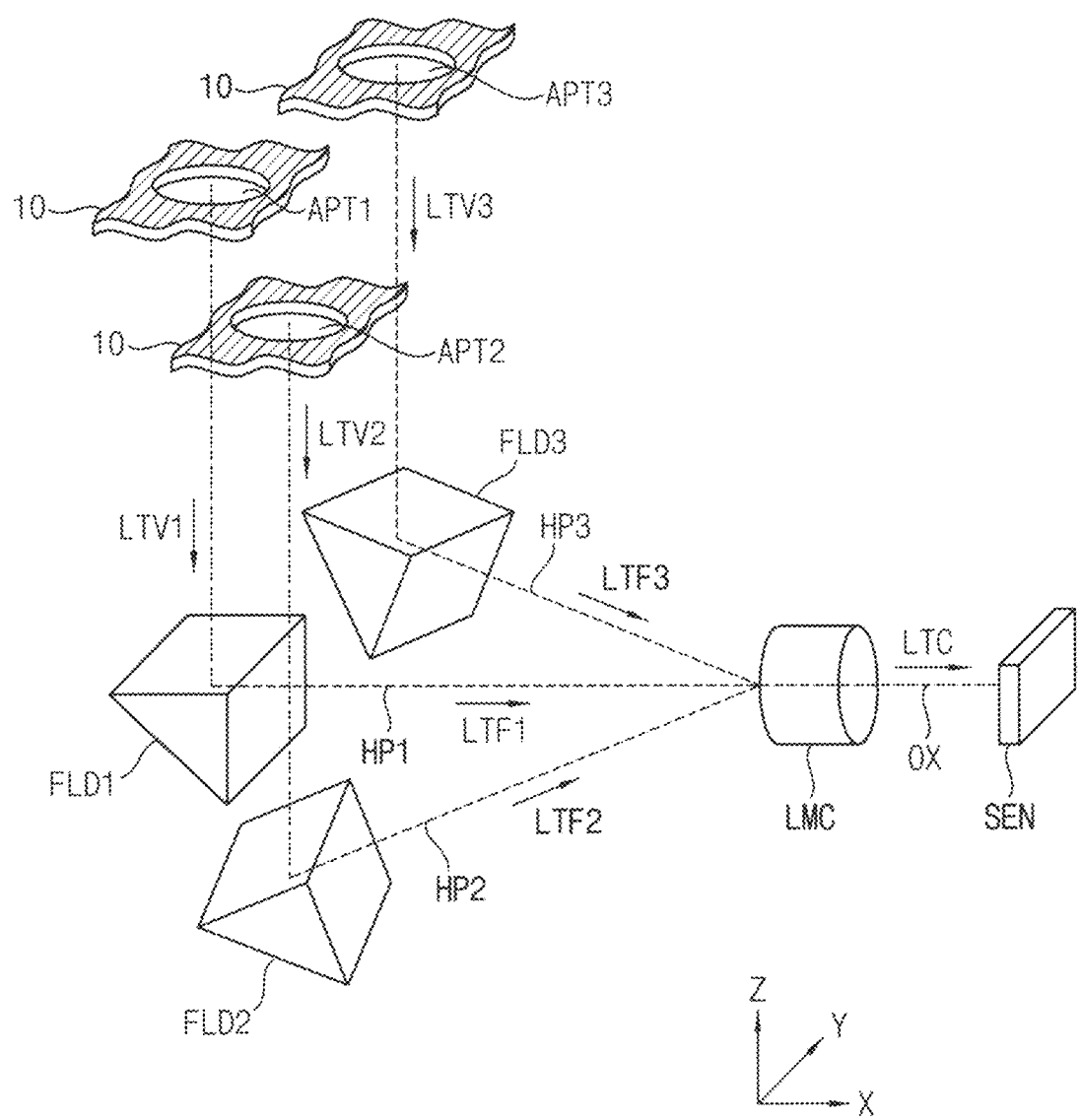
FIG. 1 is a diagram illustrating a perspective view of a multi-input folded camera according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
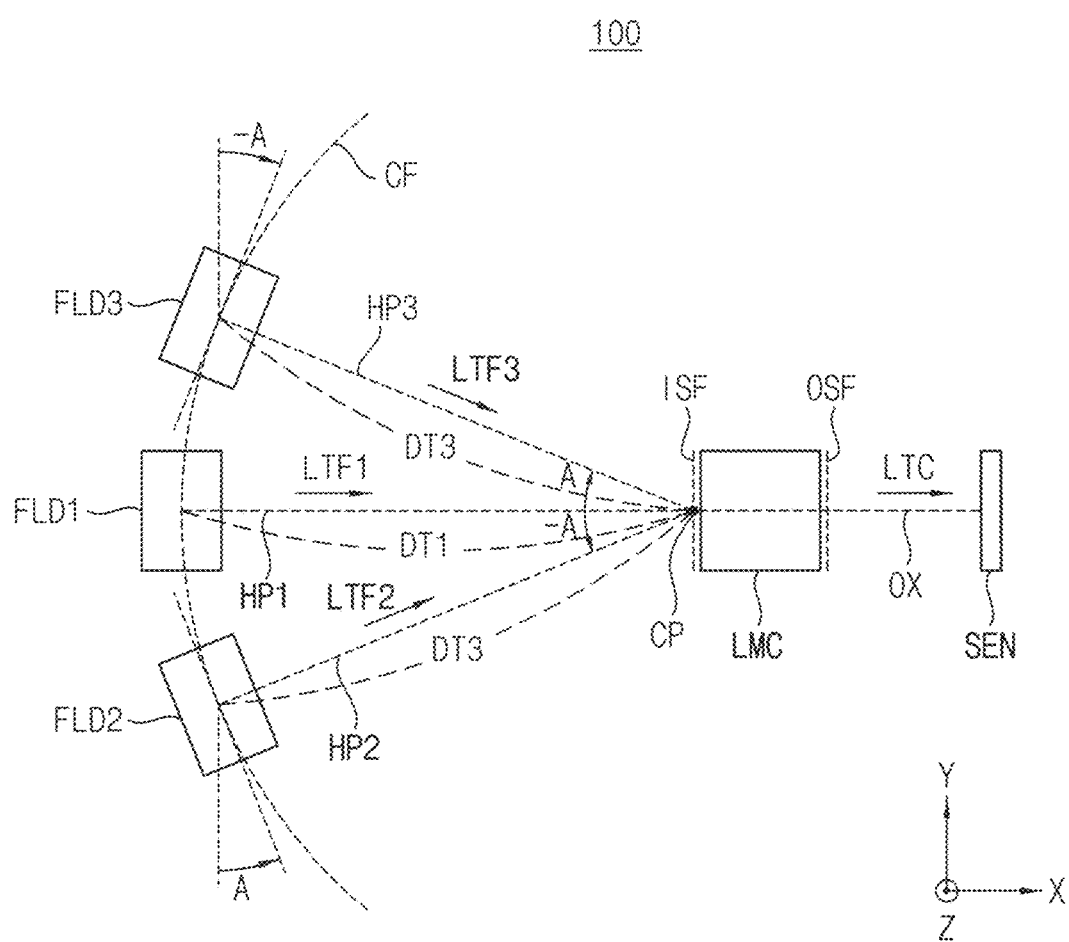
FIG. 2 is a diagram illustrating a plan view of the multi-input folded camera of FIG. 1.

FIG. 1 is a diagram illustrating a perspective view of a multi-input folded camera according to example embodiments, and FIG. 2 is a diagram illustrating a plan view of the multi-input folded camera of FIG. 1.

In this disclosure, Z indicates a vertical direction, and X and Y indicate first and second horizontal directions perpendicular to the vertical direction Z. The first horizontal direction X and the second horizontal direction may be perpendicular to each other. For example, the vertical direction Z may be perpendicular to a surface of a substrate on which a multi-input folded camera is mounted. However, it will be understood that the spatially relative terms (e.g., vertical, horizontal, and under) are intended to encompass different orientations of the device in use or operation in addition to the orientation depicted in the figures without materially departing from the inventive concepts. For example, if the device in the figures is turned sideways, the direction Z and/or the first and second horizontal directions X and Y may be rotated accordingly. Thus, the device may be otherwise oriented (rotated 90 degrees or at other orientations) and the spatially relative descriptors used herein interpreted accordingly.

Referring to FIGS. 1 and 2, a multi-input folded camera 100 may include a plurality of folding devices FLD1, FLD2, and FLD3, a common lens module LMC, and a sensor SEN.

The plurality of folding devices FLD1, FLD2, and FLD3 may change light paths of vertical lights LTV1, LTV2, and LTV3 that are incident on the plurality of folding devices FLD1, FLD2, and FLD3 in a vertical direction Z to output a plurality of folded lights LTF1, LTF2 and LTF3 propagating along a plurality of horizontal paths HP1, HP2, and HP3 on a horizontal plane perpendicular to the vertical direction Z.

The common lens module LMC may combine the plurality of folded lights LTF1, LTF2 and LTF3 that are received through an input surface ISF of the common lens module LMC to output a combined light LTC through an output surface OSF of the common lens module LMC. The common lens module LMC may be, for example, a lens array including two or more lens, and/or waveguides configured to combine the plurality of folded lights LTF1, LTF2, and LTF3 and output the combined light LTC towards the sensor SEN.

The sensor SEN may be disposed at an optical axis OX of the common lens module LMC to receive the combined light LTC.

FIGS. 1 and 2 illustrate an example embodiment of three folding devices, a first folding device FLD1, a second folding device FLD2, and a third folding device FLD3 for convenience of illustration and description. However, the multi-input folded camera according to the example embodiments may include various numbers of folding devices, for example, as will be described below with reference to FIGS. 6 and 7.

The first folding device FLD1 may change a light path of a first vertical light LTV1 that is incident on the first folding device FLD1 in the vertical direction Z to output a first folded light LTF1 propagating along a first horizontal path PH1 on the horizontal plane perpendicular to the vertical direction Z.

The second folding device FLD2 may change a light path of a second vertical light LTV2 that is incident on the second folding device FLD2 in the vertical direction Z to output a second folded light LTF2 propagating along a second horizontal path HP2 on the horizontal plane.

The third folding device FLD3 may change a light path of a third vertical light LTV3 that is incident on the third folding device FLD3 in the vertical direction Z to output a third folded light LTF3 propagating along a third horizontal path HP3 on the horizontal plane.

The first vertical light LTV1, the second vertical light LTV2, and the third vertical light LTV3 may be provided through apertures in a light blocking layer 10. The light blocking layer 10 may be a component included in or external to the multi-input folded camera 100.

For example, the light blocking layer 10 may include a first aperture APT1, a second aperture APT2, and a third aperture APT3. The first vertical light LTV1 may be provided through the first aperture APT1, the second vertical light LTV2 may be provided through the second aperture APT2, and the third vertical light LTV3 may be provided through the third aperture APT3.

In some example embodiments, the folding devices FLD1, FLD2 and FLD3 may be implemented with prisms or mirrors.

The common lens module LMC may combine the first folded light LTF1, the second folded light LTF2 and the third folded light LTF3 that are received through the input surface ISF of the common lens module LMC to output the combined light LTC through the output surface OSF of the common lens module LMC.

The common lens module LMC may be implemented with a combination of two or more lenses and may include an input surface ISF and an output surface OSF. FIG. 2 illustrates, for convenience of illustration, that the input surface ISF and the output surface OSF as separate from the common lens module LMC. The input surface ISF indicates a front surface of a lens that is disposed firstly in the common lens module LMC and the output surface OSF indicates a back surface of a lens that is disposed lastly in the common lens module LMC. At least one of the input surface ISF and the output surface OSF may be a curved surface.

The sensor SEN may be disposed at the optical axis OX of the common lens module LMC to receive the combined light LTC.

In some example embodiments, the sensor SEN may be implemented as an image sensor. For example, the sensor SEN may be an array of photo-sensitive pixels, configured to detect and/or record the presence light, for example photo-diodes, charged-coupled devices, and/or photo-resistors. The first vertical light LTV1, the second vertical light LTV2, and the third vertical light LTV3 may be provided through different paths, and the sensor SEN may be provided image data based on the combined light LTC of the first vertical light LTV1, the second vertical light LTV2, and the third vertical light LTV3. The sensor SEN may be a tele-image sensor providing a tele-image corresponding to a relatively narrow field of view (FOV), and/or the sensor SEN may be a wide image sensor providing a wide image corresponding to a relatively wide field of view.

In other example embodiments, the sensor SEN may be implemented as various sensors having different functions. For example, the sensor SEN may be one of a luminance sensor, a dynamic vision sensor, a depth sensor adopting a time of flight (ToF) scheme, etc.

The first horizontal path HP1 of the first folded light LTF2, the second horizontal path HP2 of the second folded light LTF2, and the third horizontal path HP3 of the third folded light LTF3 may cross at a cross point CP on the optical axis OX of the common lens module LMC. In addition, the folding devices FLD1, FLD2, and FLD3 and the common lens module LMC may be disposed such that the cross point CP may coincide with a center point of the input surface ISF of the common lens module LMC. Thus, the image information of an object may be enforced by combining the lights provided through different light paths.

In some example embodiments, the first, second, and third folding devices FLD1, FLD2, and FLD3 may be on a circumference CF of a circle such that the center of the circle is the cross point CP.

The first, second, and third folding devices FLD1, FLD2, and FLD3 may be disposed at an equal distance from the cross point CP on the optical axis OX of the common lens module LMC. For example, the first, second and third folding devices FLD1, FLD2, and FLD3 may be disposed such that a distance DT1 between the first folding device FLD1 and the cross point CP, a distance DT2 between the second folding device FLD2 and the cross point CP and a distance DT3 between the third folding device FLD3 may be the same.

In some example embodiments, the first, second and third folding devices FLD1, FLD2 and FLD3 may be symmetrical with respect to the optical axis OX of the common lens module LMC, and/or rotationally symmetrical to a cross point and/or the center of a circle. For example, the first folding device FLD1 may be disposed such that the first horizontal path HP1 may coincide with the optical axis OX of the common lens module LMC, the second folding device FLD2 may be disposed such that the second horizontal path HP2 may form a negative acute angle (−A) with the optical axis OX of the common lens module LMC, and the third folding device FLD3 may be disposed such that the third horizontal path HP3 may form a positive acute angle (A) with the optical axis OX of the common lens module LMC. Thus, the image information of an object may be enforced by combining the light provided through different light paths.

As such, the multi-input folded camera and the mobile device including the multi-input folded camera according to the example embodiments may enhance reliability of information provided from the sensor and/or the quality of an image provided from the sensor by combining lights through the plurality of light paths to increase the amount of light input to the sensor.

Figure 3:
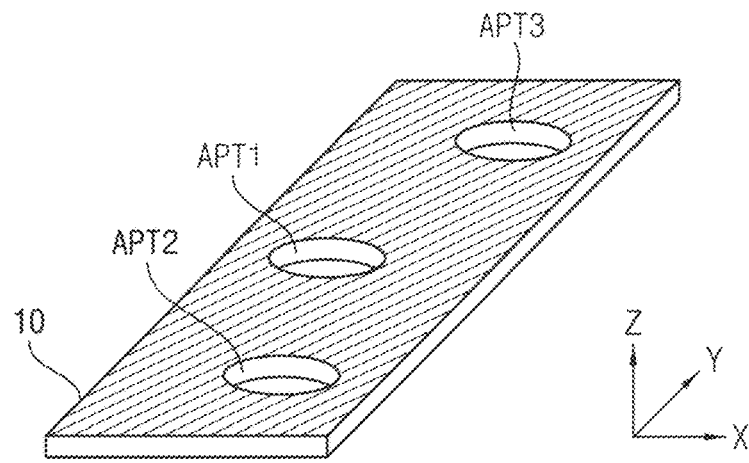
FIG. 3 is a diagram illustrating a perspective view of an example embodiment of a light blocking layer included in a multi-input folded camera according to example embodiments.
Figure 4:
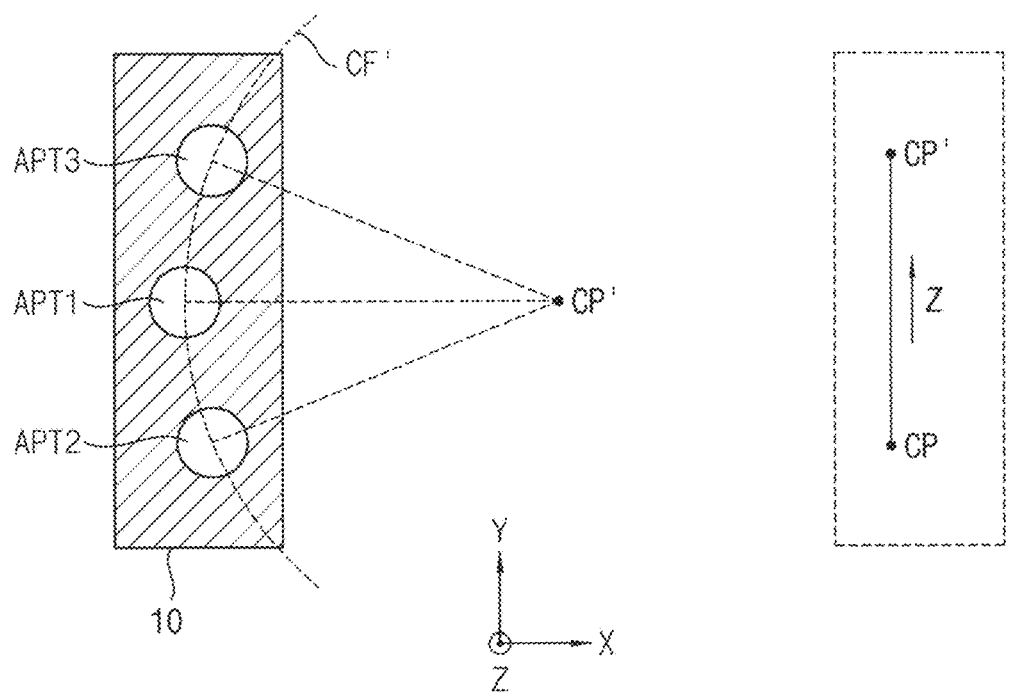
FIG. 4 is a diagram illustrating a plan view of the light blocking layer of FIG. 3.

FIG. 3 is a diagram illustrating a perspective view of an example embodiment of a light blocking layer included in a multi-input folded camera according to example embodiments, and FIG. 4 is a diagram illustrating a plan view of the light blocking layer of FIG. 3.

FIGS. 3 and 4 illustrate an example embodiment of a light blocking layer 10 that may be disposed above the plurality of folding devices. The light blocking layer 10 may be parallel to the horizontal plane including the plurality of horizontal paths of the plurality of folded lights. FIGS. 3 and 4 illustrate an example embodiment of the light blocking layer 10 including the first aperture APT1, the second aperture APT2, and the third aperture APT3 corresponding the first folding device FLD1, the second folding device FLD2, and the third folding device FLD3 for convenience of illustration and description, and the number and the positions of the apertures may be determined variously according to the number and the positions of the folding devices.

Referring to FIGS. 3 and 4, the first aperture APT1, the second aperture APT2 and, the third aperture APT3 may be disposed on a circumference CF' of a circle such that a center of the circle is a cross point CP'. The cross point CP' may be superimposed with the above-described cross point CP in the vertical direction Z. The first, second, and third apertures APT1, APT2, and APT3 may be at an equal distance from the cross point CP'.

Figure 5:
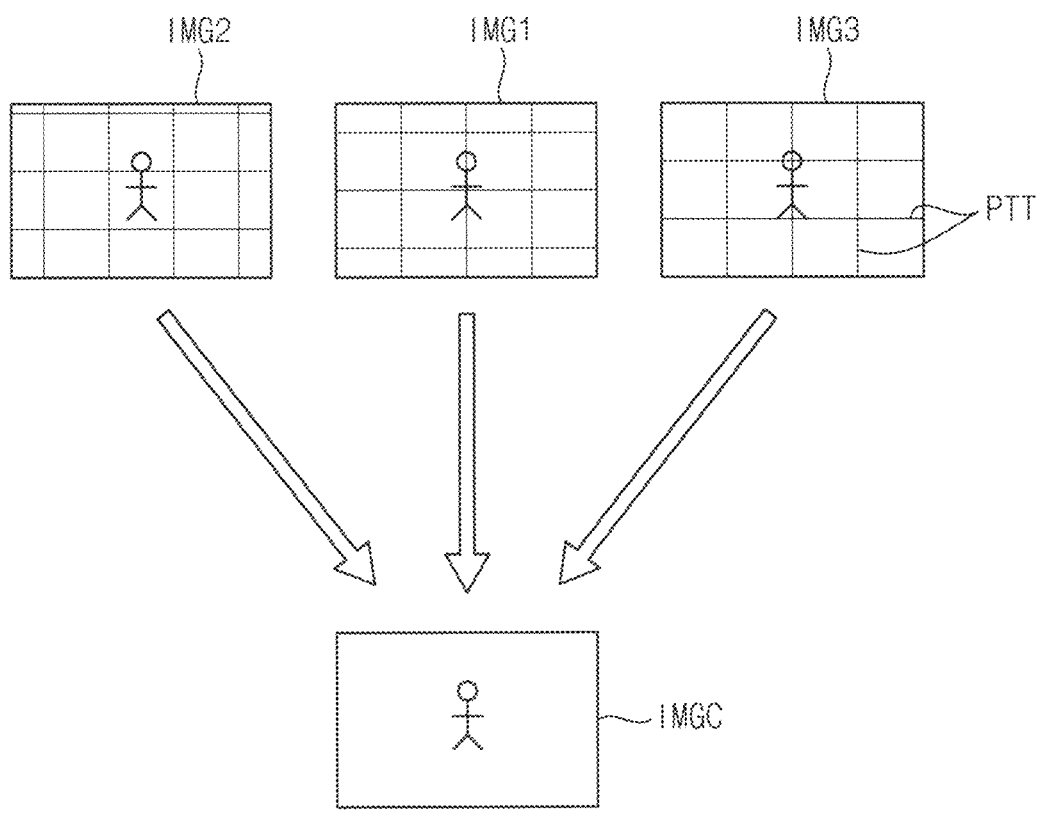
FIG. 5 is a diagram for describing an image provided by a multi-input folded camera according to example embodiments.

FIG. 5 is a diagram for describing an image provided by a multi-input folded camera according to example embodiments.

FIG. 5 illustrates images that may be provided by a multi-input folded camera included in a mobile device as will be described below with reference to FIGS. 13 through 16.

A first image IMG1 may correspond to a case when the second folded light LTF2 and the third folded light LTF3 are blocked and only the first folded light LTF1 is focused on the sensor SEN. A second image IMG2 may correspond to a case when the first folded light LTF1 and the third folded light LTF3 are blocked and only the second folded light LTF2 is focused on the sensor SEN. A third image IMG3 may correspond to a case when the first folded light LTF1 and the second folded light LTF2 are blocked and only the third folded light LTF3 is focused on the sensor SEN. A combined image IMGC may correspond to a case when the first, second, and third folded lights LTF1, LTF2, and LTF3 are combined and focused on the sensor SEN.

The first, second, and third images IMG1, IMG2, and IMG3 corresponds to an image provided using only one aperture. The first, second and third images IMG1, IMG2, and IMG3 may be dark, because sufficient light amount may not be secured, and, if the aperture is under a display panel, the first, second, and third images IMG1, IMG2, and IMG3 may include interference patterns PTT (e.g., voids and/or shadows) due to a lattice structure of the display panel.

The multi-input folded camera according to example embodiments may provide an image without the interference pattern PTT, such as the combined image IMGC, because a plurality of vertical lights along a plurality of light paths are combined and focused on an image sensor SEN.

In comparison with a single-input camera, the multi-input folded camera, according to the example embodiments, may be advantageous in securing image quality in environments of low luminance or through mediums with low penetration of light. In addition, the multi-input folded camera according to example embodiments may reduce image degradation due to the interference pattern PTT, which may be a problem for an under display camera (UDC) under the display panel, which will be described below with reference to FIGS. 13 through 16.

As such, the multi-input folded camera according to example embodiments may be disposed under the display panel to be implemented as a front camera of the mobile device and efficiently support entire-region display without an aperture in the display panel for high penetration rate.

Figure 6:
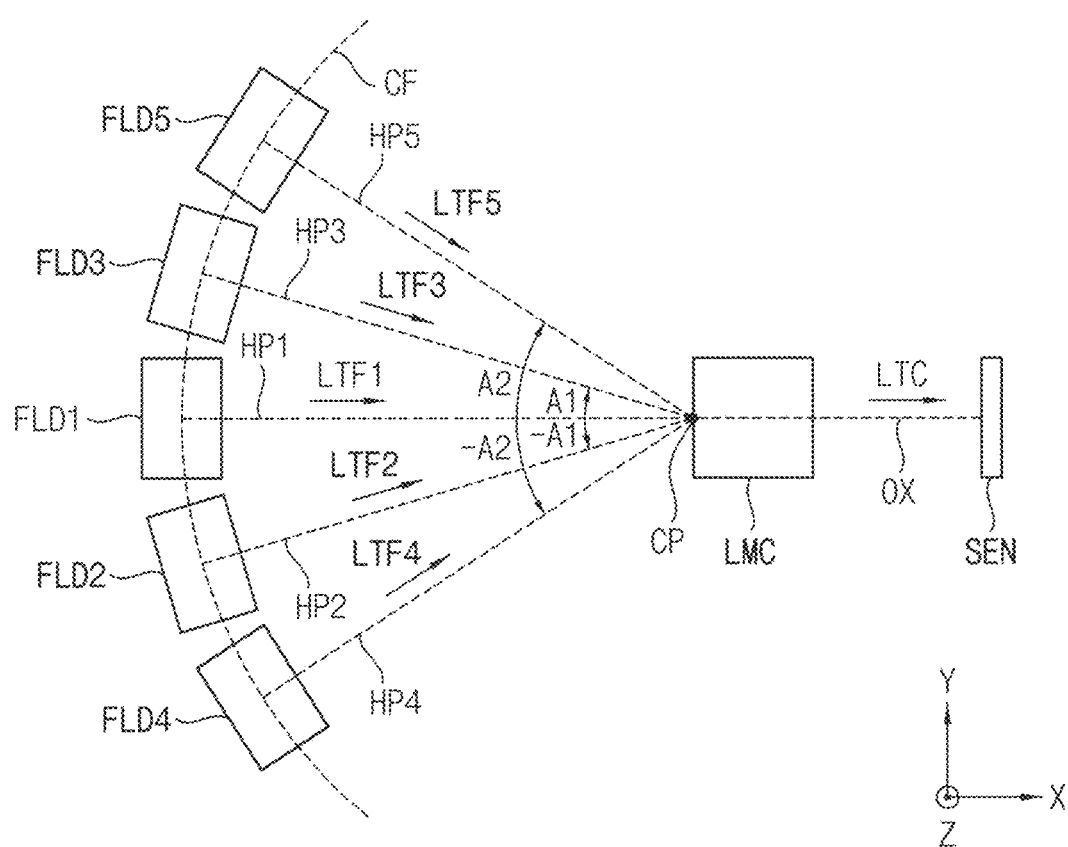
FIGS. 6 and 7 are diagrams illustrating a multi-input folded camera including various numbers of folding devices according to example embodiments.
Figure 7:
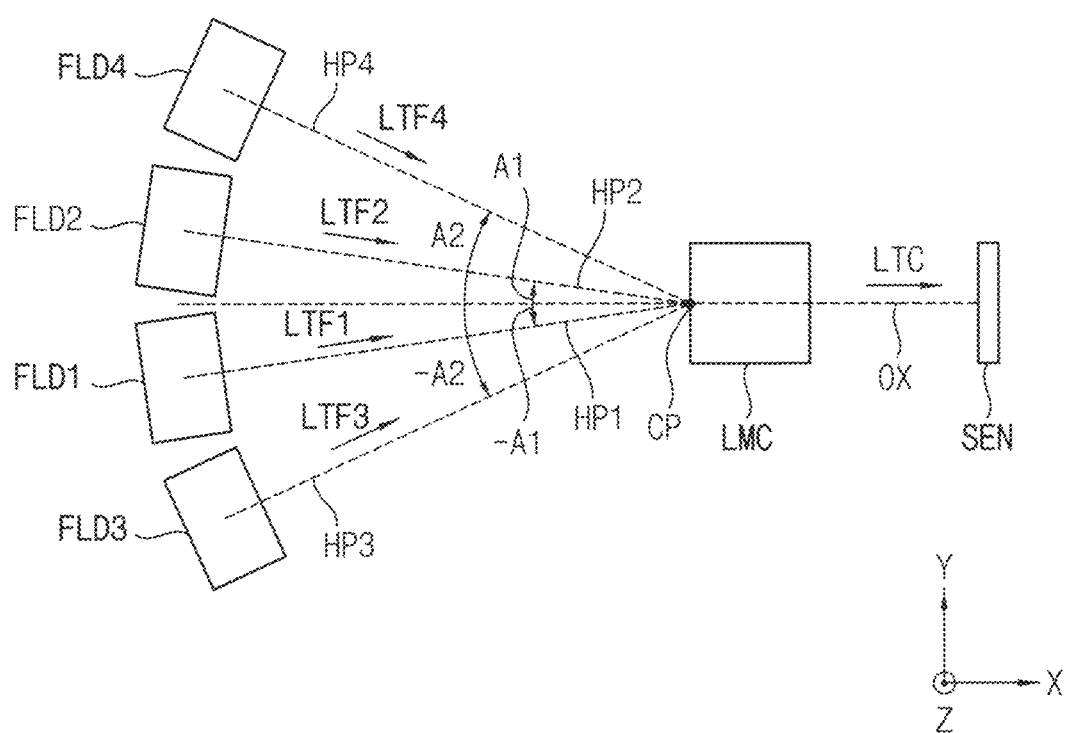

FIGS. 6 and 7 are diagrams illustrating a multi-input folded camera including various numbers of folding devices according to example embodiments.

The example embodiments are described referring to only plan views of FIGS. 6 and 7, and the example embodiments will be understood further if the descriptions of FIGS. 1 through 4 are referred to.

FIG. 6 illustrates a multi-input folded camera including an odd number of folding devices that are symmetrical with respect to an optical axis of a common lens module. In this case, one horizontal path of a plurality of horizontal paths may coincide with the optical axis of the common lens module, and each horizontal path except the one horizontal path may form an acute angle with the optical axis of the common lens module.

Referring to FIG. 6, a multi-input folded camera 101 may include a first folding device FLD1, a second folding device FLD2, a third folding device FLD3, a fourth folding device FLD4, a fifth folding device FLD5, a common lens module LMC, and a sensor SEN.

The first folding device FLD1 may change a light path of a first vertical light LTV1 that is incident on the first folding device FLD1 in the vertical direction Z to output a first folded light LTF1 propagating along a first horizontal path PH1 on the horizontal plane perpendicular to the vertical direction Z.

The second folding device FLD2 may change a light path of a second vertical light LTV2 that is incident on the second folding device FLD2 in the vertical direction Z to output a second folded light LTF2 propagating along a second horizontal path HP2 on the horizontal plane.

The third folding device FLD3 may change a light path of a third vertical light LTV3 that is incident on the third folding device FLD3 in the vertical direction Z to output a third folded light LTF3 propagating along a third horizontal path HP3 on the horizontal plane.

The fourth folding device FLD4 may change a light path of a fourth vertical light LTV4 that is incident on the fourth folding device FLD4 in the vertical direction Z to output a fourth folded light LTF4 propagating along a fourth horizontal path HP4 on the horizontal plane.

The fifth folding device FLD5 may change a light path of a fifth vertical light LTV5 that is incident on the fifth folding device FLD5 in the vertical direction Z to output a fifth folded light LTF5 propagating along a fifth horizontal path HP5 on the horizontal plane.

The common lens module LMC may combine the first through fifth folded lights LTF1 through LTF5 received through an input surface of the common lens module LMC and output a combined light LTC through an output surface of the common lens module LMC.

The sensor SEN may be disposed at an optical axis OX of the common lens module LMC to receive the combined light LTC.

The first horizontal path HP1 of the first folded light LTF2, the second horizontal path HP2 of the second folded light LTF2, the third horizontal path HP3 of the third folded light LTF3, the fourth horizontal path HP4 of the fourth folded light LTF4, and the fifth horizontal path HP5 of the fifth folded light LTF5 may cross at a cross point CP on the optical axis OX of the common lens module LMC. In addition, the first through fifth folding devices FLD1 through FLD5 may be disposed such that the cross point CP may coincide with a center point of the input surface of the common lens module LMC. Thus, the image information of an object may be enforced by combining the lights provided through different light paths.

In some example embodiments, the first through fifth folding devices FLD1 through FLD5 may be disposed on a circumference CF of a circle such that the center of the circle is the cross point CP on the optical axis OX of the common lens module LMC.

In some example embodiments, the first through fifth folding devices FLD1 through FLD5 may be symmetrical with respect to the optical axis OX of the common lens module LMC. For example, the first folding device FLD1 may be disposed such that the first horizontal path HP1 may coincide with the optical axis OX of the common lens module LMC, the second folding device FLD2 may be disposed such that the second horizontal path HP2 may form a negative acute angle (−A) with the optical axis OX of the common lens module LMC, the third folding device FLD3 may be disposed such that the third horizontal path HP3 may form a positive acute angle (A) with the optical axis OX of the common lens module LMC, the fourth folding device FLD4 may be disposed such that the fourth horizontal path HP4 may form a negative acute angle (-2A) with the optical axis OX of the common lens module LMC, and the fifth folding device FLD5 may be disposed such that the fifth horizontal path HP5 may form a positive acute angle (2A) with the optical axis OX of the common lens module LMC. Thus, the image information of an object may be enforced by combining the lights provided through different light paths.

FIG. 7 illustrates a multi-input folded camera including an even number of folding devices that are disposed symmetrically with respect to an optical axis of a common lens module. In this case, each horizontal path of the plurality of horizontal paths forms an acute angle with the optical axis of the common lens module.

Referring to FIG. 7, a multi-input folded camera 102 may include a first folding device FLD1, a second folding device FLD2, a third folding device FLD3, a fourth folding device FLD4, a common lens module LMC and a sensor SEN.

The first folding device FLD1 may change a light path of a first vertical light LTV1 that is incident on the first folding device FLD1 in the vertical direction Z to output a first folded light LTF1 propagating along a first horizontal path PH1 on the horizontal plane perpendicular to the vertical direction Z.

The second folding device FLD2 may change a light path of a second vertical light LTV2 that is incident on the second folding device FLD2 in the vertical direction Z to output a second folded light LTF2 propagating along a second horizontal path HP2 on the horizontal plane.

The third folding device FLD3 may change a light path of a third vertical light LTV3 that is incident on the third folding device FLD3 in the vertical direction Z to output a third folded light LTF3 propagating along a third horizontal path HP3 on the horizontal plane.

The fourth folding device FLD4 may change a light path of a fourth vertical light LTV4 that is incident on the fourth folding device FLD4 in the vertical direction Z to output a fourth folded light LTF4 propagating along a fourth horizontal path HP4 on the horizontal plane.

The common lens module LMC may combine the first through fourth folded lights LTF1 through LTF4 that are received through an input surface of the common lens module LMC to output a combined light LTC through an output surface of the common lens module LMC.

The sensor SEN may be disposed at an optical axis OX of the common lens module LMC to receive the combined light LTC.

The first horizontal path HP1 of the first folded light LTF2, the second horizontal path HP2 of the second folded light LTF2, the third horizontal path HP3 of the third folded light LTF3, the fourth horizontal path HP4 of the fourth folded light LTF4, and the fifth horizontal path HP5 of the fifth folded light LTF5 may cross at a cross point CP on the optical axis OX of the common lens module LMC. In addition, the first through fourth folding devices FLD1 through FLD4 may be disposed such that the cross point CP on the optical axis OX of the common lens module LMC may coincide with a center point of the input surface of the common lens module LMC. Through such disposition, the image information of an object may be enforced by combining the lights provided through different light paths.

In some example embodiments, the first through fourth folding devices FLD1 through FLD4 may be disposed on a circumference CF of a circle such that a center of the circle is the cross point CP on the optical axis OX of the common lens module LMC.

In some example embodiments, the first through fourth folding devices FLD1 through FLD4 may be disposed symmetrically with respect to the optical axis OX of the common lens module LMC. For example, the first folding device FLD1 may be disposed such that the first horizontal path HP1 may form a negative acute angle (−A) with the optical axis OX of the common lens module LMC, the second folding device FLD2 may be disposed such that the second horizontal path HP2 may form a positive acute angle (A) with the optical axis OX of the common lens module LMC, the third folding device FLD3 may be disposed such that the third horizontal path HP3 may form a negative acute angle (−2A) with the optical axis OX of the common lens module LMC, and the fourth folding device FLD4 may be disposed such that the fourth horizontal path HP4 may form a positive acute angle (2A) with the optical axis OX of the common lens module LMC. Through such symmetrical disposition, the image information of an object may be enforced by combining the lights provided through different light paths.

Figure 8:
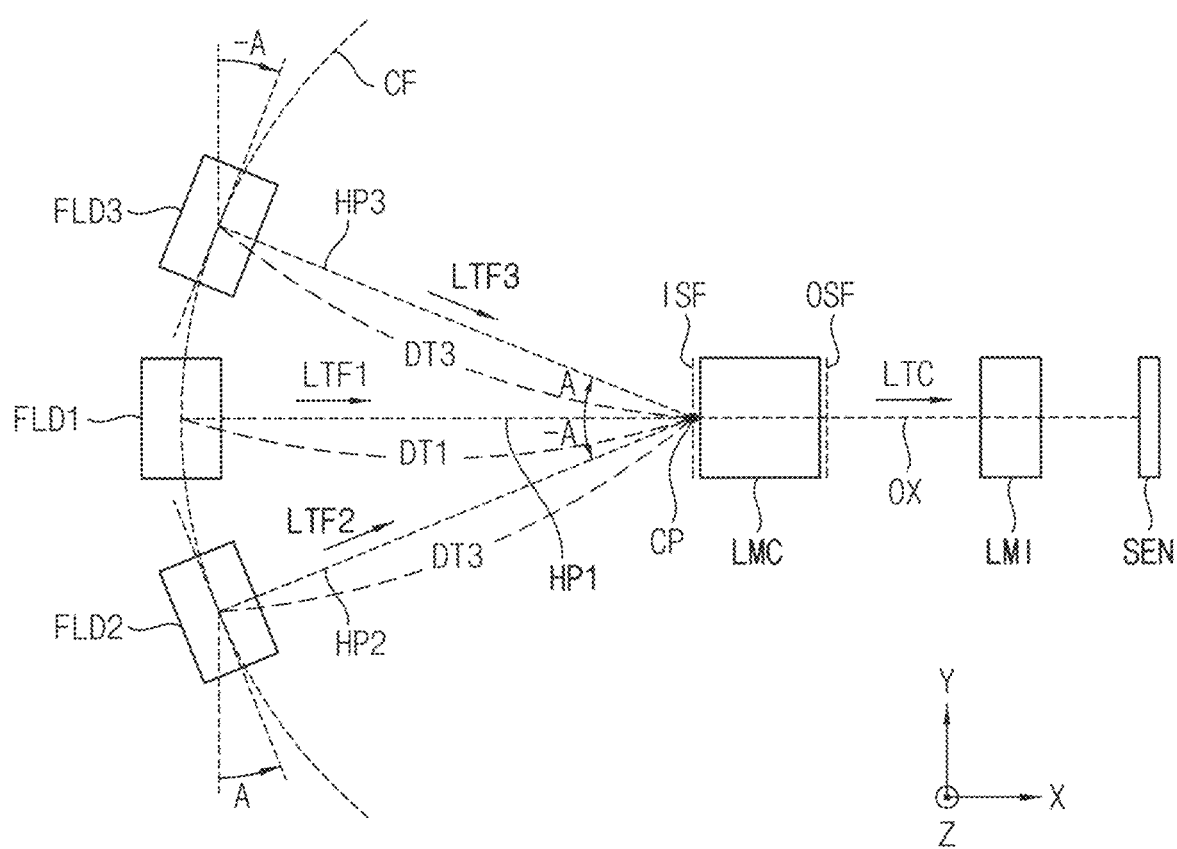
FIGS. 8 and 9 are diagrams illustrating a multi-input folded camera according to example embodiments.
Figure 9:
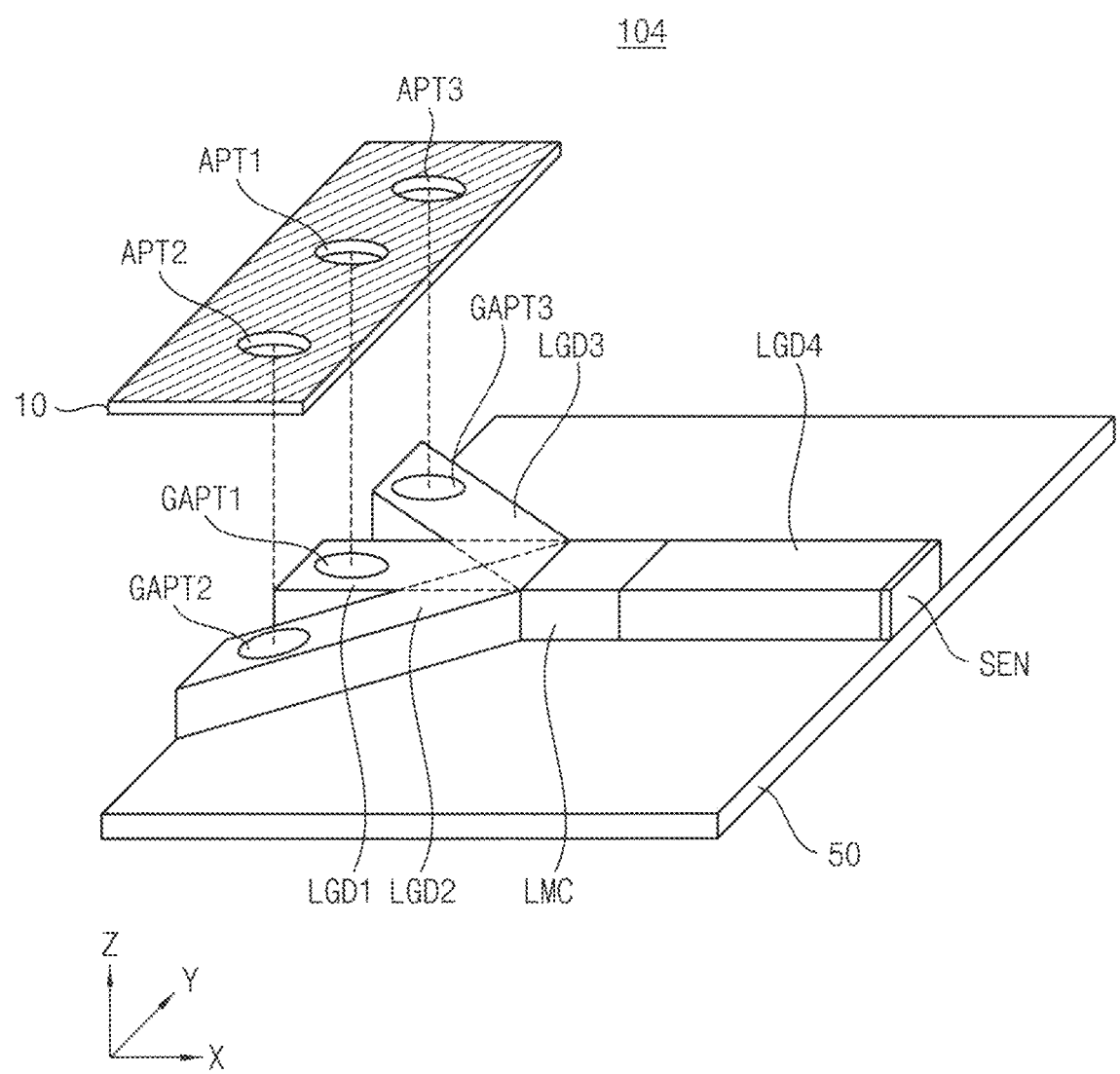

FIGS. 8 and 9 are diagrams illustrating a multi-input folded camera according to example embodiments.

A multi-input folded camera 103 of FIG. 8 is similar to the multi-input folded camera 100 of FIGS. 1 and 2, and the repeated descriptions are omitted.

In comparison with the multi-input folded camera 100 of FIGS. 1 and 2, the multi-input folded camera 103 of FIG. 8 may further include a sensor lens module LMI.

The sensor lens module LMI may be disposed between the common lens module LMC and the sensor SEN such that an optical axis of the sensor lens module coincides with the optical axis OX of the common lens module LMC. The sensor lens module LMI may include an array of one or more lens configured to magnify and/or focus the combined light LTC from the common lens module LMC onto the sensor SEN. The sensor lens module LMI may be configured to change the focal length of the lens array.

Thus, the quality of the image captured by the sensor SEN may be enhanced by adding the sensor lens module LMI. In addition, the magnification rate of the image captured by the sensor SEN may be adjusted by changing the relative distances between the common lens module LMC, the sensor lens module LMI and the sensor SEN.

Referring to FIG. 9, a multi-input folded camera 104 may be implemented in the form of a module using a base substrate 50. Light guides LGD1, LGD2, LGD3 and LGD4 may be formed on the base substrate 50 and the above-described embodiments may be implemented using the guides LGD1, LGD2, LGD3 and LGD4.

FIG. 9 illustrates only the common lens module LMC and sensor SEN for convenience of illustration. It will be understood that the folding devices as described above may be, for example, inside the light guides LGD1, LGD2, and LGD3, above the light guides LGD1, LGD2, AND LGD3, and/or terminal to the lights guides LGD1, LGD2, and LDG3. The above-described vertical lights may be traverse through the apertures APT1, APT2, and APT3 formed in the light blocking layer 10 and the apertures GAPT1, GAPT2, and GAPT3 formed in the light guides LGD1, LFG2, and LGD3.

The light guides LGD1 through LGD4 may be formed with materials for blocking noise such as, for example, unintended external lights. The material may be a transparent material, for example, glass and/or a plastic like acrylic or polystyrene, with a high refractive index. In addition, anti-reflection coating films may be formed on inner surface of the light guides LGD1 through LGD4 to reduce noise such as, for example, unintended internal lights. The anti-reflection coating films may be, for example, a plastic and/or silicone resin with a similar or different refractive index from the material comprising the light guides LDG1 through LDG4.

Figure 10:
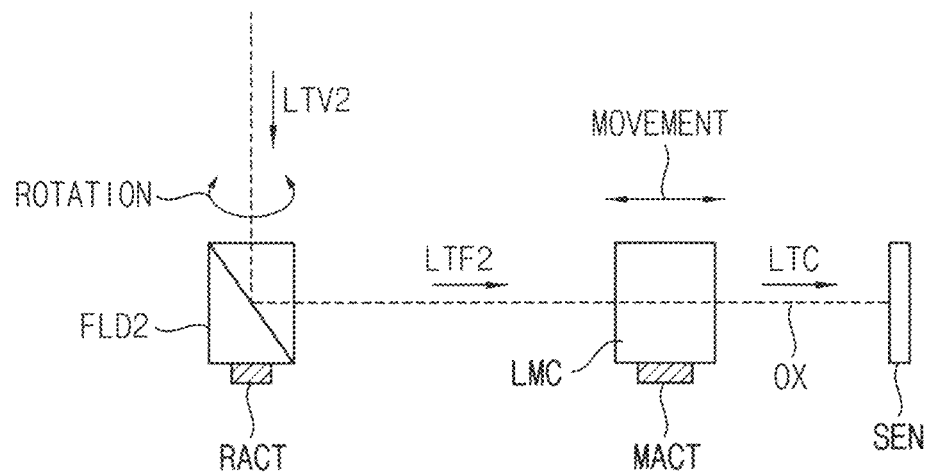
FIG. 10 is a diagram illustrating a multi-input folded camera including actuators according to example embodiments.

FIG. 10 is a diagram illustrating a multi-input folded camera including actuators according to example embodiments.

Referring to FIG. 10, the multi-input folded camera may further include a rotating actuator RACT and/or a moving actuator MACT.

The rotating actuator RACT may be configured to rotate at least one (e.g., the second folding device FLD2 as shown in FIG. 10) of the plurality of folding devices on a rotation axis parallel to the vertical direction and/or a rotating actuator RACT may be configured to rotate each of the folding devices.

The moving actuator MACT may be configured to move the common lens module LMC along the optical axis OX of the common lens module LMC. A moving actuator MACT may also control the distancing of the sensor lens module LMI to the commons lens module LMC and/or the sensor SEN. For example, the moving actuator MACT may be configured to move the common lens module LMC, the sensor lens module LMI, and/or the sensor SEN in combination or individually, or each of the common lens module LMC, the sensor lens module LMI, and/or the sensor may each comprise a moving actuators MACT.

Figure 11:
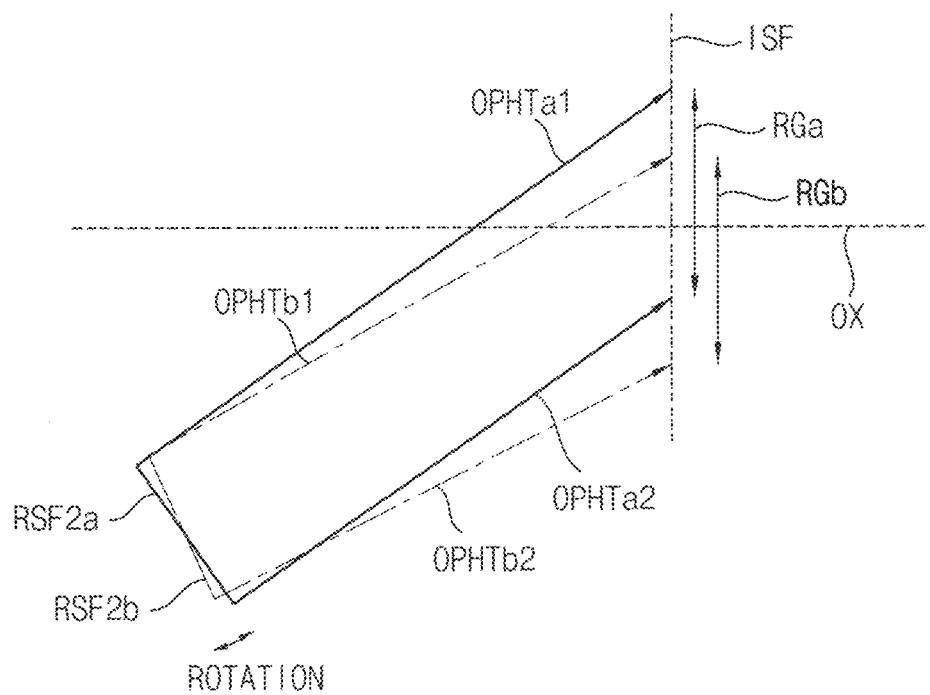
FIGS. 11 and 12 are diagrams illustrating operations of the multi-input folded camera of FIG. 10.
Figure 12:
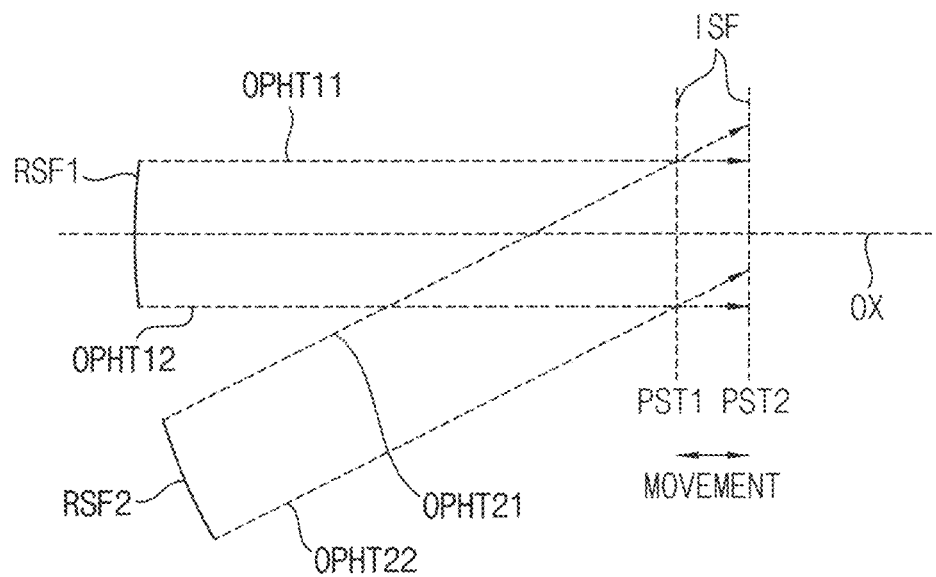

FIGS. 11 and 12 are diagrams illustrating operations of the multi-input folded camera of FIG. 10.

Referring to FIG. 11, a position of a focused image on the input surface ISF of the common lens module LMC may be changed by rotating a reflection surface of the second folding device FLD2 using the rotating actuator RACT. For example, when the reflection surface of the second folding device FLD2 corresponds to a first reflection surface RSF2a, the second folded light LTF2 is incident on a first region RGa corresponding to two edge light paths OPHTa1 and OPHTa2. In contrast, when the reflection surface of the second folding device FLD2 corresponds to a second reflection surface RSF2b, the second folded light LTF2 is incident on a second region RGb corresponding to two edge light paths OPHTb1 and OPHTb2. As such, the image information of an object may be enforced by rotating at least one folding device using the rotating actuator RACT and combining the lights provided through different light paths.

Referring to FIG. 12, a range of superposition of the first folded light LTF1 and the second folded light LTF2 may be adjusted by moving the common lens module LMC along the optical axis OX of the common lens module LMC using the moving actuator MACT. FIG. 12 illustrates the two edge light paths OPHT11 and OPHT12 of the first folded light LTF1 reflected from the reflection surface RSF1 of the first folding device FLD1 and the two edge light paths OPHT21 and OPHT22 of the second folded light LTF2 reflected from the reflection surface RSF2 of the second folding device FLD2. For example, when the input surface of the common lens module LMC is located at a first position PST1, the superposition of the first folded light LTF1 and the second folded light LTF2 may be improved and/or optimized. In contrast, when the input surface of the common lens module LMC is located at a second position PST3, the superposition of the first folded light LTF1 and the second folded light LTF2 may be relieved. As such, the image information of an object may be enforced by moving the common lens module LMC along the optical axis OX of the common lens module LMC using the moving actuator MACT and combining the lights provided through different light paths.

Figure 13:
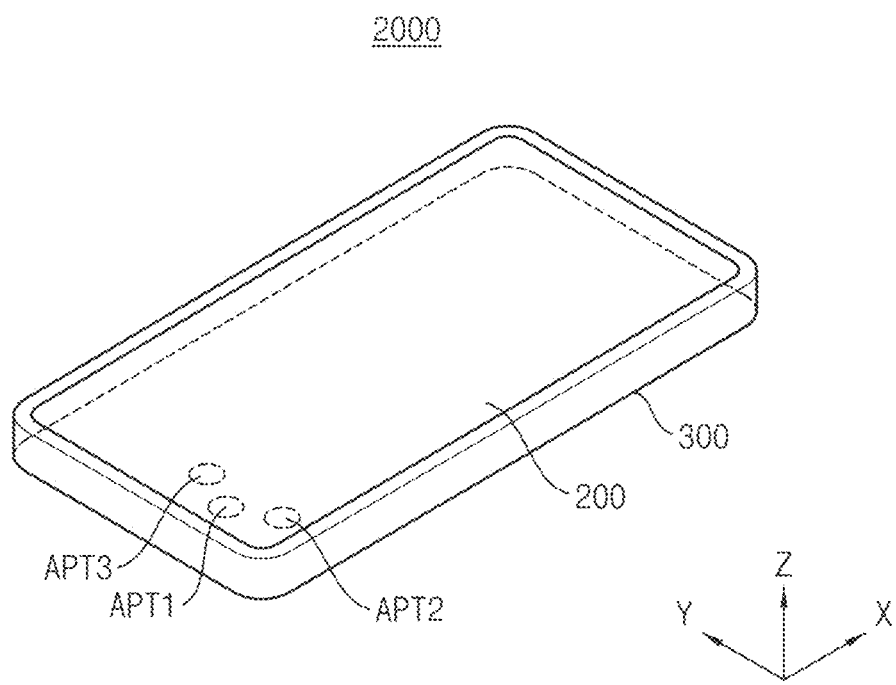
FIG. 13 is a diagram illustrating a perspective view of a housing case and display of a mobile device including a multi-input folded camera according to example embodiments.
Figure 14:
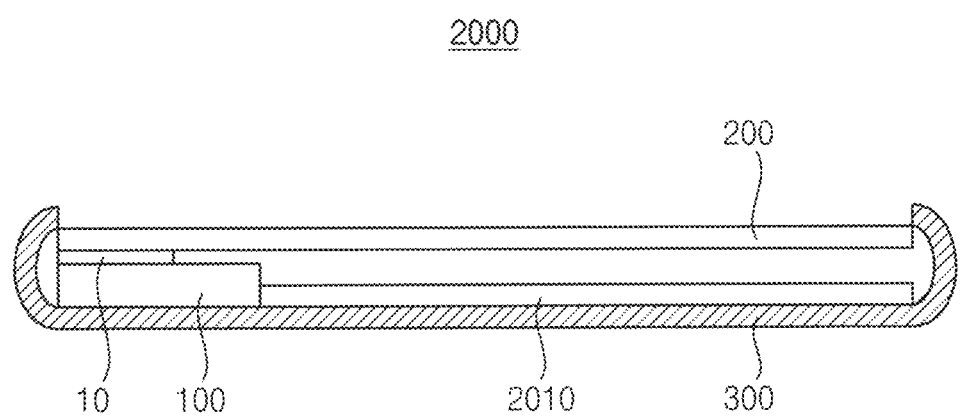
FIG. 14 is a diagram illustrating an example embodiment of a vertical structure of the mobile device of FIG. 13.

FIG. 13 is a diagram illustrating a perspective view of a housing case and display of a mobile device including a multi-input folded camera according to example embodiments; FIG. 14 is a diagram illustrating an example embodiment of a vertical structure of the mobile device of FIG. 13; and FIG. 15 is a diagram illustrating an example embodiment of a layout of the mobile device of FIG. 13.

Figure 15:
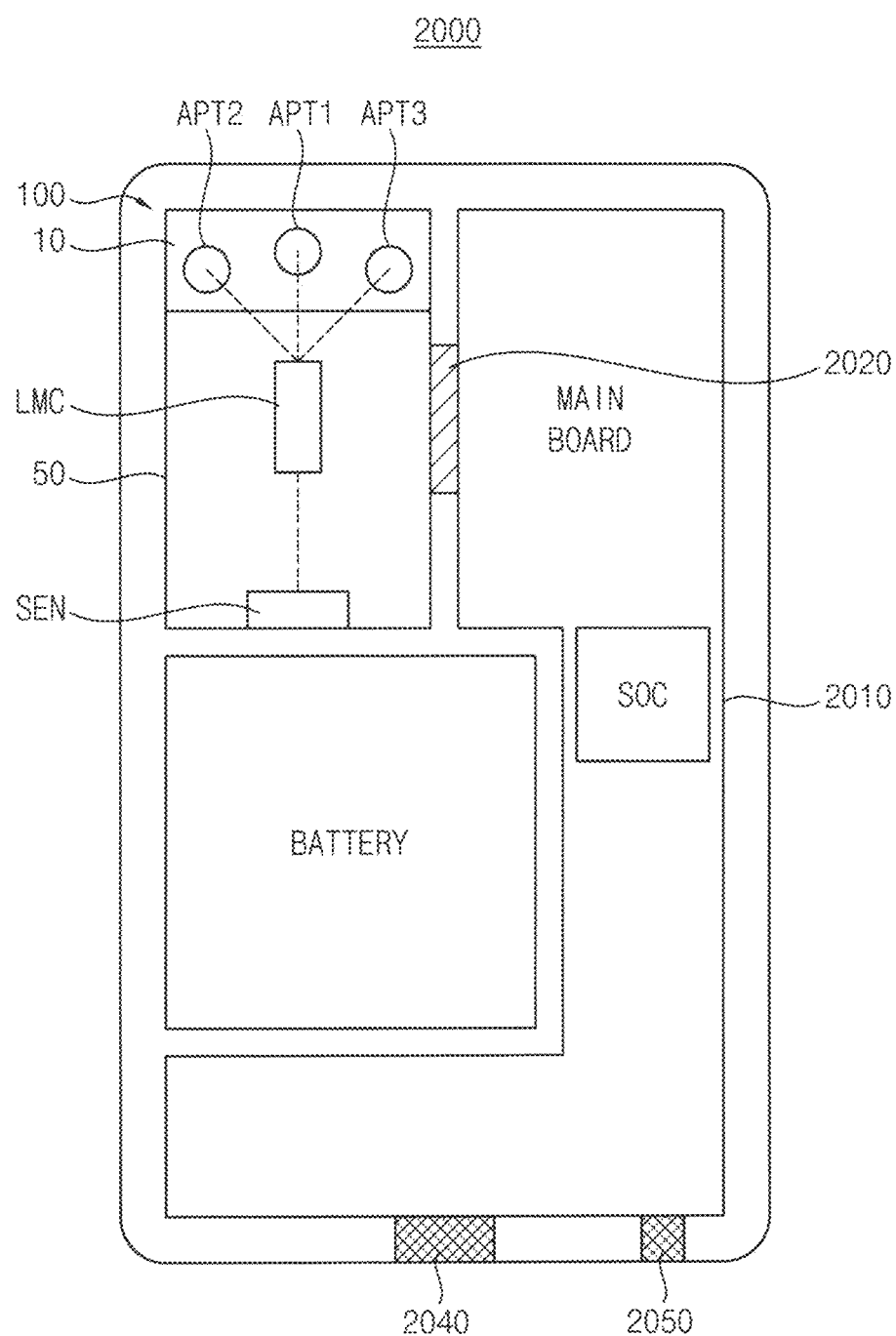
FIG. 15 is a diagram illustrating an example embodiment of a layout of the mobile device of FIG. 13.

Referring to FIGS. 13, 14 and 15, a mobile device 2000 such as, for example, a smartphone, may include a housing case 300, a main board 2010, a multi-input folded camera 100, a display panel 200, a battery 2030, and so on. The housing case 300 may have an upper surface that is opened, and the display panel 200 may be disposed to block the upper surface of the housing case 300. A USB terminal 2040, and a headset or earphone terminal 2050 may be formed at a bottom portion of the housing case 300. The multi-input folded camera 100 is disposed under the display panel 200.

The main board 2010, the multi-input folded camera 100 and the battery 2030 may be mounted in the housing case 300. The multi-input folded camera 100 may be electrically connected to the main board 2010 through a connector 2020. The connector 2020 may be, for example, a bus. Various components may be integrated on the main board 2010, for example a system on chip SOC. A camera controller (not illustrated) configured to control the multi-input folded camera 100 and/or process data provided from the multi-input folded camera 100 may be included in the system on chip SOC, implemented as a distinct chip to be mounted on the main board 2010, and/or integrated into the multi-input folded camera 100. The camera controller may be, for example, configured to control a rotating actuator RACT and/or a moving actuator MACT. The camera controller may include processing circuitry such hardware including logic circuits; a hardware/software combination such as a processor executing software; or a combination thereof. For example, the processing circuity more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc."

The mobile device 2000 may include a light blocking layer 10 disposed between the multi-input folded camera 100 and the display panel 200. A plurality of apertures APT1, APT2 and APT3 may be formed in the light blocking layer 10 so as to pass a plurality of vertical lights.

As described above, the multi-input folded camera 100 may include a plurality of folding devices (not shown), a common lens module LMC and a sensor SEN. The plurality of folding devices may change light paths of vertical lights that penetrate the display panel 200 and are incident on the plurality of folding devices through the apertures APT1, APT2 and APT3 in the vertical direction to output a plurality of folded lights propagating along a plurality of horizontal paths on a horizontal plane perpendicular to the vertical direction. The common lens module LMC may combine the plurality of folded lights that are received through an input surface of the common lens module LMC to output a combined light through an output surface of the common lens module LMC. The sensor SEN may be disposed at an optical axis of the common lens module LMC to receive the combined light. The components of the multi-input folded camera 100 may be mounted or integrated on the same substrate 50. The substrate 50 may be implemented, for example, as a printed circuit board (PCB).

Figure 16:
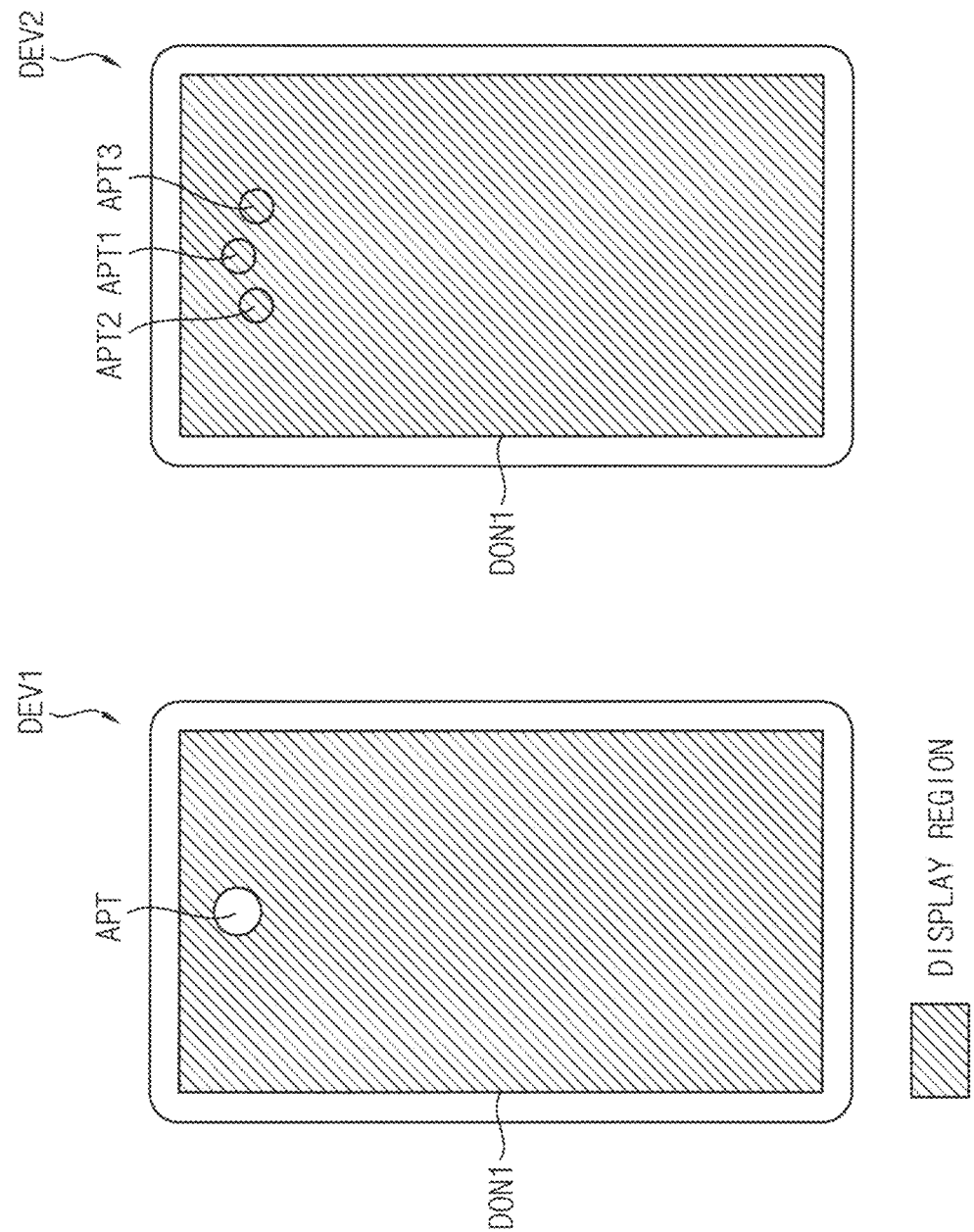
FIG. 16 is a diagram for describing a display function of a mobile device according to example embodiments.

FIG. 16 is a diagram for describing a display function of a mobile device according to example embodiments.

FIG. 16 illustrates a first mobile device DEV1 and a second mobile device DEV2 having an under display camera (UDC) structure such that a camera is disposed under a display panel.

A first display panel DON1 of the first mobile device DEV1 according to a conventional scheme includes an aperture APT to increase the amount of the vertical light provided to the camera disposed under the first display panel DON1. In this case, a portion of an image cannot be displayed on the aperture portion of the first display panel DON1 as shown in FIG. 16.

Conventional imaging devices adopt a lens of a large size or multiple cameras for sufficient light amounts so as to improve image quality in low-luminance environments. In addition, the conventional imaging devices include the aperture in the display panel to overcome the interference pattern due to the lattice structure of the display panel.

In contrast, in the case of the second mobile device DEV2 including a multi-input folded camera according to example embodiments, the apertures APT1, APT2 and APT3 are formed in the light blocking layer between a second display panel DON2 and the multi-input folded camera to pass the vertical lights that have penetrate the second display panel DON2. The second display panel DON2 may not include apertures for the multi-input folded camera disposed under the second display panel DON2, and thus an entire image may be displayed on the entire region of the second display panel DON2.

The example embodiments may be applied in image devices and/or in a camera. The light amount received by a sensor SEN may be secured efficiently by implementing multiple apertures, folding the vertical lights through the apertures and combining the folded lights. Through such configuration, the image quality may be improved in the low-luminance environments. Particularly, in the case of the UDC structure, the entire-region display may be realized without an aperture interrupting the display panel.

As such, the multi-input folded camera and the mobile device including the multi-input folded camera according to example embodiments may enhance reliability of information provided from the sensor and/or quality of image provided from the sensor by combining light through the plurality of light paths to increase the amount of light input to the sensor. In addition, the multi-input folded camera according to example embodiments may be disposed under the display panel to be implemented as a front camera of the mobile device and efficiently support entire-region display without an aperture in the display panel for high penetration rate.

The inventive concepts may be applied to any electronic devices and systems including an imaging device or a camera. For example, the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A multi-input folded camera comprising:
a plurality of folding devices configured to change paths of lights incident to the plurality of folding devices in a first direction and to output a plurality of folded lights propagating along a plurality of paths on a plane perpendicular to the first direction;
a common lens array configured to combine the plurality of folded lights through an input surface of the common lens array and to output a combined light through an output surface of the common lens array; and
a sensor at an optical axis of the common lens array, the sensor configured to receive the combined light.

2. The multi-input folded camera of claim 1, wherein the plurality of paths of the plurality of folded lights cross at a cross point on the optical axis of the common lens array.

3. The multi-input folded camera of claim 2, wherein the cross point of the plurality of folding devices coincides with a center point of the input surface of the common lens array.

4. The multi-input folded camera of claim 1, wherein the plurality of folding devices is on a circumference of a circle, the circle including a center on the optical axis of the common lens array.

5. The multi-input folded camera of claim 1, wherein the plurality of folding devices are disposed at an equal distance from a point on the optical axis of the common lens array.

6. The multi-input folded camera of claim 1, wherein a number of the plurality of folding devices is an odd number and the plurality of folding devices is symmetrical with respect to the optical axis of the common lens array.

7. The multi-input folded camera of claim 6, wherein one path of the plurality of paths coincides with the optical axis of the common lens array, and each path of the plurality of paths, except the one path, forms an acute angle with the optical axis of the common lens array.

8. The multi-input folded camera of claim 1, wherein a number of the plurality of folding devices is an even number and the plurality of folding devices is symmetrical with respect to the optical axis of the common lens array.

9. The multi-input folded camera of claim 8, wherein each path of the plurality of paths forms an acute angle with the optical axis of the common lens array.

10. The multi-input folded camera of claim 1, further comprising:
a light blocking layer disposed above the plurality of folding devices, the light blocking layer including a plurality of apertures to pass the plurality of lights incident to the plurality of folding devices.

11. The multi-input folded camera of claim 1, further comprising:
a sensor lens array between the common lens array and the sensor, an optical axis of the sensor lens array coinciding with the optical axis of the common lens array.

12. The multi-input folded camera of claim 1, further comprising:
a rotating actuator configured to rotate at least one of the plurality of folding devices on a rotational axis parallel to the first direction.

13. The multi-input folded camera of claim 1, further comprising:
a moving actuator configured to move the common lens array along the optical axis of the common lens array.

14. The multi-input folded camera of claim 1, wherein the plurality of folding devices, the common lens array, and the sensor are mounted on a substrate.

15. A mobile device comprising:
a housing case having an upper surface, the upper surface defining an opening;
a display panel in the opening defined by the upper surface of the housing case; and
a multi-input folded camera below the display panel, the multi-input folded camera comprising
a plurality of folding devices configured to change paths of lights that are incident to the plurality of folding devices in a first direction and to output a plurality of folded lights propagating along a plurality of paths on a plane perpendicular to the first direction;
a common lens array configured to receive, through an input surface, the plurality of folded light, combine the plurality of folded lights, and to output the combined light through an output surface; and
a sensor at an optical axis of the common lens array, the sensor configured to receive the combined light.

16. The mobile device of claim 15, wherein the lights provided to the plurality of folding devices include lights penetrating the display panel.

17. The mobile device of claim 15, further comprising:
a light blocking layer disposed between the plurality of folding devices and the display panel, the light blocking layer including a plurality of apertures configured to pass the lights provided to the plurality of folding devices.

18. The mobile device of claim 15, wherein the display panel is configured to display an image on an entire upper surface of the display panel.

19. A multi-input folded camera comprising:
a first folding device configured to change a light path of a first light that is incident to the first folding device in a first direction and to output a first folded light propagating along a first path on a plane perpendicular to the first direction;
a second folding device configured to change a light path of a second light that is incident to the second folding device in the first direction and to output a second folded light propagating along a second path on the plane;
a third folding device configured to change a light path of a third light that is incident to the third folding device in the first direction to output a third folded light propagating along a third path on the plane;
a common lens array configured to receive the first folded light, the second folded light, and the third folded light through an input surface, combine the first folded light, the second folded light, and the third folded light and to output a combined light through an output surface of the common lens array; and a sensor at an optical axis of the common lens array, the sensor configured to receive the combined light.

20. The multi-input folded camera of claim 19, wherein the first path coincides with the optical axis of the common lens array, and the second path and the third path each form an acute angle with the optical axis of the common lens array.

* * * * *

UNITED STATES PATENT AND TRADEMARK OFFICE
CERTIFICATE OF CORRECTION

| | |
|---|---|
| PATENT NO. | : 11,392,012 B2 |
| APPLICATION NO. | : 16/884443 |
| DATED | : July 19, 2022 |
| INVENTOR(S) | : Kang et al. |

It is certified that error appears in the above-identified patent and that said Letters Patent is hereby corrected as shown below:

On the Title Page

Insert:
-- (30) Foreign Application Priority Data
Oct. 21, 2019 (KR).......... 10-2019-0130443 --

Signed and Sealed this
Twentieth Day of September, 2022

*Katherine Kelly Vidal*
Katherine Kelly Vidal
*Director of the United States Patent and Trademark Office*